Patented July 30, 1940

UNITED STATES PATENT OFFICE 2,209,872

EXTRACTION OF PHENOL FROM PHENOLIC SOLUTIONS

Kurt Buchheim, Radebeul, near Dresden, and Hellmuth Pflugk, Berlin, Germany, assignors to Chemische Fabrik Von Heyden Aktiengesellschaft, Radebeul, near Dresden, Germany, a corporation of Germany No Drawing. Application February 17, 1938, Serial No. 190,976. In Germany February 26, 1937

5 Claims. (Cl. 260—627)

The present invention relates particularly to the extraction of phenol from various liquors which are the by-products of the manufacture of phenol, but is applicable to the extraction of phenol from other solutions in which it may be present.

We have discovered that diaryl ethers are of exceptional and unexpected value for this purpose, and possess many important advantages over other compounds which have previously been used or proposed.

The diaryl ethers which are suitable for the present process, are stable in both alkaline and acid media, are not decomposed upon heating to a temperature of 256° C., are insoluble in water, and are readily available at a comparatively low price.

Among the diaryl ethers which are particularly useful in the present process are diphenyl oxide, phenyl diphenyl oxide, and other analogous diaryl ethers.

The process of extracting phenol from waste liquors may be carried out as follows. An extraction apparatus of any suitable design is charged with the waste liquors or other phenolic solutions, and these are continuously passed through the apparatus. The diphenyl oxide is also passed through the extraction apparatus, and upon removal from the apparatus the diphenyl oxide and the phenol are separated in any suitable manner.

Diphenyloxide, due to its lower specific gravity and its insolubility in water, can be easily separated from the heavier salt-containing solution. It may be separated as an upper layer in an apparatus built on a separatory funnel principle and the salt solution drawn off at the bottom. The extraction process can be conducted continuously, for instance, by passing a stream of diphenyloxide in finely divided form through the phenol containing solution. The separation of the diphenyloxide containing the extracted phenol is effected continuously by means of a side overflow. The extracted phenol may be recovered from the diphenyloxide either by distillation or by extraction with alkali solutions, or by other known methods.

Diphenyl oxide has a solidifying point of 26 to 27° C., and therefore it is desirable to lower the solidifying point. This may be done in various ways, but it has been discovered that it may be very effectively done by the addition of phenyl diphenyl ether. Inasmuch as technical diphenyl oxide normally contains about 10 to 20% of phenol diphenyl oxide, the technical product may be used directly for the extraction process. The relative proportions may be as follows:

Example 1.—One liter of phenolic solution containing 12.9 grams of phenol and about 150 grams of sodium chloride is extracted six times with 50 cc. of diphenyl oxide. The phenol content of the solution is thereby reduced to about 1.1 grams per liter.

Example 2.—One liter of phenolic solution containing 16.7 grams of phenol and 175 grams of sodium chloride is extracted four times at room temperature with 100 cc. of diphenyl oxide, which contains about 15% of phenyl diphenyl oxide. The phenol content of the solution after the fourth extraction is reduced to 1.25 grams of phenol. By further repeating the extraction, the phenol content may be reduced to 0.8 gram per liter.

These examples merely indicate the extent to which the phenol may be extracted by means of the diaryl ether, but in commercial practice the extraction might be carried out by countercurrent flow in a suitable extraction apparatus, and might be a continuous process.

The extraction of other phenols or mixtures of various crude phenols from waste solutions or other solutions containing phenols may be accomplished by the use of various different diaryl oxides and diaryl oxide mixtures, such as dinaphthyloxide and phenylnaphthyloxide.

Having thus described our invention, what we claim as new and desire to secure by Letters Patent is:

1. The process of extracting phenol from solutions, which includes intermixing the solution with a diaryl oxide, separating the oxide and phenol from the residual solution, and thereafter separating the oxide and phenol.

2. The process of extracting phenol from a solution, which consists in passing a solution of phenol in countercurrent with a diaryl oxide, and separating the oxide and phenol of the outflowing mixture of them.

3. The process of extracting phenol from solutions, which consists in intermixing the solution with a diaryl oxide and an aryl diaryl ether, separating the oxide, phenol and ether from the residual solution, and thereafter separating the phenol from the oxide and ether.

4. The process of extracting phenol from solutions, which includes intermixing the solution with a diphenyl oxide, separating the oxide and phenol from the residual solution, and thereafter separating the oxide and phenol.

5. The process of extracting phenol from solutions, which includes intermixing the solution with a diphenyl oxide and phenyl diphenyl oxide, separating the oxides and phenol from the residual solution, and thereafter separating the oxides and phenol.

KURT BUCHHEIM.
HELLMUTH PFLUGK.